US012447959B2

(12) United States Patent
Horiguchi

(10) Patent No.: US 12,447,959 B2
(45) Date of Patent: Oct. 21, 2025

(54) DRIVER ASSISTANCE APPARATUS FOR VEHICLE

(71) Applicant: SUBARU CORPORATION, Tokyo (JP)

(72) Inventor: Harunobu Horiguchi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 50 days.

(21) Appl. No.: 18/602,815

(22) Filed: Mar. 12, 2024

(65) Prior Publication Data

US 2024/0326801 A1 Oct. 3, 2024

(30) Foreign Application Priority Data

Mar. 28, 2023 (JP) .................. 2023-052108

(51) Int. Cl.
*B60W 30/14* (2006.01)
*B60W 10/20* (2006.01)

(52) U.S. Cl.
CPC .......... *B60W 30/143* (2013.01); *B60W 10/20* (2013.01); *B60W 2552/40* (2020.02); *B60W 2720/14* (2013.01)

(58) Field of Classification Search
CPC ............... B60W 30/143; B60W 10/20; B60W 2552/40; B60W 2720/14; B60W 40/068; B60W 40/105

USPC ......................................... 701/41
See application file for complete search history.

(56) References Cited

U.S. PATENT DOCUMENTS

| 6,081,761 | A | * | 6/2000 | Harada | ................... B60T 8/327 701/72 |
| 2020/0156607 | A1 | * | 5/2020 | Ueno | ................... B60W 30/02 |

FOREIGN PATENT DOCUMENTS

JP 2022-161700 A 10/2022

\* cited by examiner

*Primary Examiner* — Yi-Kai Wang
(74) *Attorney, Agent, or Firm* — MCGINN I.P. LAW GROUP, PLLC

(57) ABSTRACT

A driver assistance apparatus for a vehicle includes a determiner, an estimator, a detector, and a deceleration rate setter. The determiner determines whether the vehicle is slipping in vehicle speed control involving acceleration or deceleration of the vehicle. The estimator estimates a road surface frictional coefficient at a location where the vehicle starts slipping as a first road surface frictional coefficient. The detector detects a high frictional coefficient area that has a second road surface frictional coefficient higher than the first road surface frictional coefficient and is located in front of the vehicle. The deceleration rate setter sets, in the vehicle speed control involving the deceleration, a target deceleration rate to be used when the vehicle travels in the high frictional coefficient area to a higher value than the target deceleration rate set for the first road surface frictional coefficient.

6 Claims, 10 Drawing Sheets

| IMAGE | BLACK: ASPHALT | BROWN: SOIL | WHITE: SNOW | TRANSPARENT: ICE | TRANSPARENT + WATER: MELTED ICE |
|---|---|---|---|---|---|
| ROAD SURFACE μ | HIGH | | | | LOW |

AMOUNT OF ACCUMULATED SNOW: LARGE

AMOUNT OF ACCUMULATED SNOW: SMALL

FIG. 4

| ROAD SURFACE TEMPERATURE Tr | $Tr \geq 10°C$ or $Tr \leq -20°C$ | $-10°C < Tr < -20°C$ | $10°C < Tr < -10°C$ |
|---|---|---|---|
| ROAD SURFACE μ | HIGH ⟷ LOW | | |

FIG. 5

| ROAD LOCATION | SITUATION | TRAVELING STABILITY |
|---|---|---|
| ADJACENT TO CENTER LINE | ONCOMING VEHICLE: ABSENT | 5 |
| | ONCOMING VEHICLE: PRESENT | 1 |
| | MEDIAN STRIP: ABSENT | 1 |
| | MEDIAN STRIP: PRESENT | 5 |
| WITHIN TRAVELING LANE | SITUATION | 5 |
| ADJACENT TO ROAD SHOULDER | GUTTER: ABSENT | 5 |
| | GUTTER: PRESENT | 1 |
| | SNOW WALL: ABSENT | 5 |
| | SNOW WALL: PRESENT | 2 |
| | PEDESTRIAN OR THE LIKE: ABSENT | 5 |
| | PEDESTRIAN OR THE LIKE: PRESENT | 1 |
| | STEP BETWEEN TRAVELING LANE AND ROAD SHOULDER: ABSENT | 5 |
| | STEP BETWEEN TRAVELING LANE AND ROAD SHOULDER: PRESENT | 2 |

FIG. 7

DRIVER ASSISTANCE APPARATUS FOR VEHICLE

CROSS-REFERENCE TO RELATED APPLICATIONS

The present application claims priority from Japanese Patent Application No. 2023-052108 filed on Mar. 28, 2023, the entire contents of which are hereby incorporated by reference.

BACKGROUND

The disclosure relates to a driver assistance apparatus for a vehicle that makes it possible to achieve acceleration and deceleration control of the vehicle.

Many recent vehicles include driver assistance apparatuses. In general, the driver assistance apparatus achieves driver assistance control by performing adaptive cruise control (ACC) and active lane keep centering (ALKC) control. The driver assistance apparatus reduces a driving operation load on a driver who drives the vehicle and improves traveling stability of the vehicle by performing the driver assistance control.

Various techniques relating to the driver assistance apparatus have been proposed for further improvement in convenience or the like. For example, Japanese Unexamined Patent Application Publication (JP-A) No. 2022-161700 discloses a technique in which a traffic light installed on an own vehicle lane is recognized based on image data on a frontal area of an own vehicle, and acceleration and deceleration control of the own vehicle is performed based on a distance to the traffic light recognized and a signal color of the traffic light.

SUMMARY

An aspect of the disclosure provides a driver assistance apparatus for a vehicle. The driver assistance apparatus includes a determiner, an estimator, a detector, and a deceleration rate setter. The determiner is configured to determine whether the vehicle is slipping in vehicle speed control involving acceleration or deceleration of the vehicle. The estimator is configured to estimate a road surface frictional coefficient at a location where the vehicle starts slipping as a first road surface frictional coefficient. The detector is configured to detect a high frictional coefficient area that has a second road surface frictional coefficient higher than the first road surface frictional coefficient and is located in front of the vehicle. The deceleration rate setter is configured to set, in the vehicle speed control involving the deceleration, a target deceleration rate to be used when the vehicle travels in the high frictional coefficient area to a higher value than the target deceleration rate set for the first road surface frictional coefficient.

An aspect of the disclosure provides a driver assistance apparatus for a vehicle. The driver assistance apparatus includes a determiner, an estimator, a detector, and an acceleration rate setter. The determiner is configured to determine whether the vehicle is slipping in vehicle speed control involving acceleration or deceleration of the vehicle. The estimator is configured to estimate a road surface frictional coefficient at a location where the vehicle starts slipping as a first road surface frictional coefficient. The detector is configured to detect a high frictional coefficient area that has a second road surface frictional coefficient higher than the first road surface frictional coefficient and is located in front of the vehicle. The acceleration rate setter is configured to set, in the vehicle speed control involving the acceleration, a target acceleration rate to be used when the vehicle travels in the high frictional coefficient area to a lower value than the target acceleration rate set for the first road surface frictional coefficient.

An aspect of the disclosure provides a driver assistance apparatus for a vehicle. The driver assistance apparatus includes a processor. The processor is configured to determine whether the vehicle is slipping in vehicle speed control involving acceleration or deceleration of the vehicle, estimate a road surface frictional coefficient at a location where the vehicle starts slipping as a first road surface frictional coefficient, detect a high frictional coefficient area that has a second road surface frictional coefficient higher than the first road surface frictional coefficient and is located in front of the vehicle, and set, in the vehicle speed control involving the deceleration, a target deceleration rate to be used when the vehicle travels in the high frictional coefficient area to a higher value than the target deceleration rate set for the first road surface frictional coefficient.

An aspect of the disclosure provides a driver assistance apparatus for a vehicle. The driver assistance apparatus includes a processor. The processor is configured to determine whether the vehicle is slipping in vehicle speed control involving acceleration or deceleration of the vehicle, estimate a road surface frictional coefficient at a location where the vehicle starts slipping as a first road surface frictional coefficient, detect a high frictional coefficient area that has a second road surface frictional coefficient higher than the first road surface frictional coefficient and is located in front of the vehicle, and set, in the vehicle speed control involving the acceleration, a target acceleration rate to be used when the vehicle travels in the high frictional coefficient area to a lower value than the target acceleration rate set for the first road surface frictional coefficient.

BRIEF DESCRIPTION OF THE DRAWINGS

The accompanying drawings are included to provide a further understanding of the disclosure, and are incorporated m and constitute a part of this specification. The drawings illustrate embodiments and, together with the specification, serve to explain the principles of the disclosure.

FIG. 4 is a map illustrating a relation between a road condition and a road surface μ according to one example embodiment of the disclosure.

FIG. 5 is a map illustrating a relation between a road surface temperature and the road surface μ according to one example embodiment of the disclosure.

FIG. 7 is a map illustrating a relation between a road condition and traveling stability at each road location according to one example embodiment of the disclosure.

DETAILED DESCRIPTION

Figure 1:
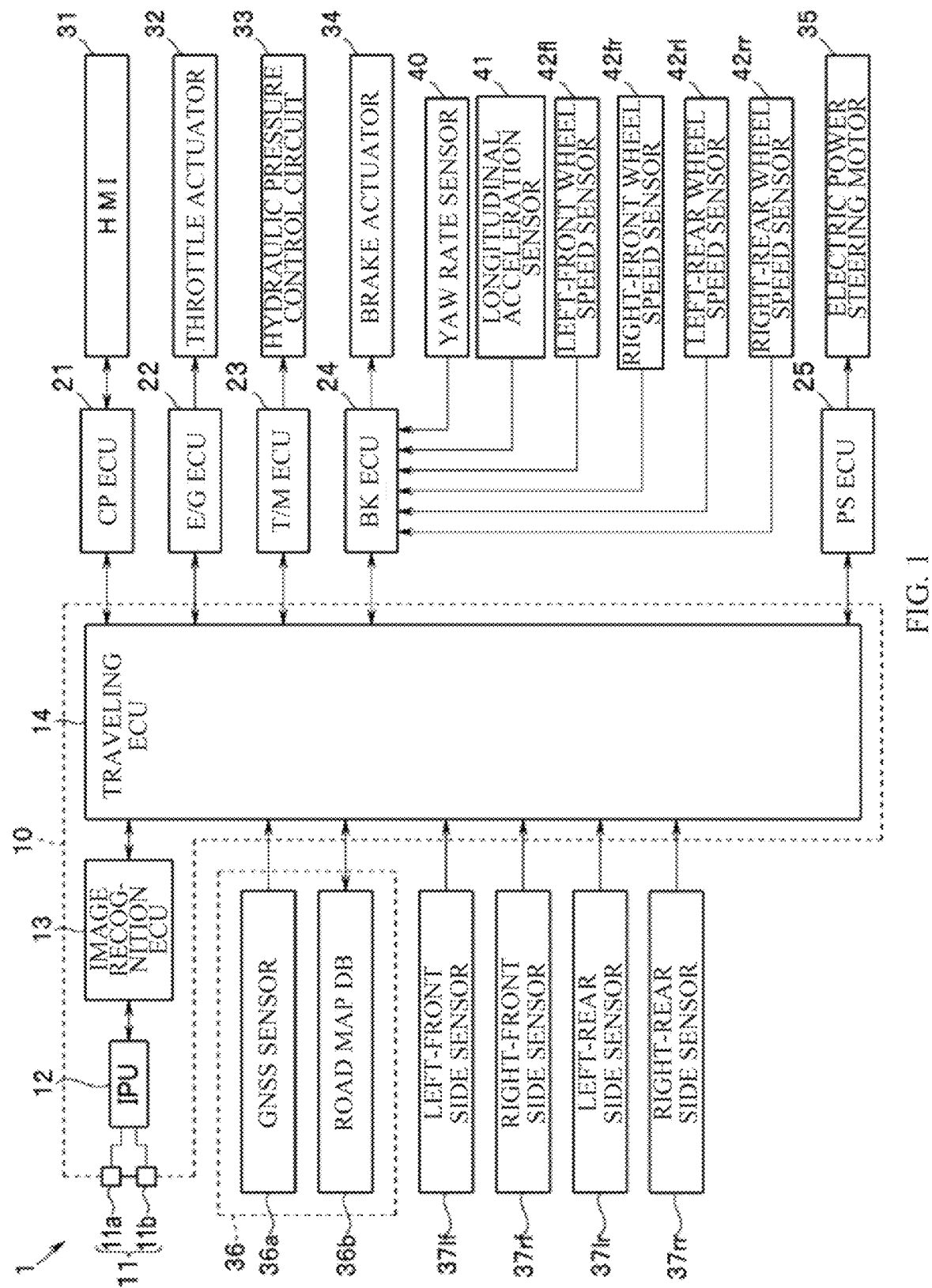
FIG. 1 is a block diagram illustrating an overall configuration of a driver assistance apparatus for a vehicle according to one example embodiment of the disclosure.

According to the technique disclosed in JP-A No. 2022-161700, it is difficult, in some cases, to achieve appropriate vehicle speed control that involves acceleration and deceleration control. For example, in a condition where a frictional coefficient μ of a road surface is low due to snow accumulated on an own vehicle traveling lane, it is difficult, in some cases, to appropriately control a vehicle speed before and after the vehicle passes through a traffic light or when the vehicle enters a curve, for example.

It is desirable to provide a driver assistance apparatus for a vehicle that makes it possible to achieve appropriate vehicle speed control depending on road surface conditions.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings. As used herein, the term "collision" may be used interchangeably with the term "contact".

As illustrated in FIG. 1, a driver assistance apparatus 1 may include a camera unit 10. The camera unit 10 may be fixed to an upper middle front portion of a vehicle compartment of a vehicle (hereinafter also referred to as an own vehicle) M, for example.

The camera unit 10 may include a stereo camera 11, an image processing unit (hereinafter referred to as an IPU) 12, an image recognition unit (hereinafter referred to as an image recognition ECU) 13, and a traveling control unit (hereinafter referred to as a traveling ECU) 14.

The stereo camera 11 may include a main camera 11a and a sub-camera 11b. The main camera 11a and the sub-camera 11b may each include an imaging device such as a CMOS. The main camera 11a and the sub-camera 11b may be disposed at respective positions that are bilaterally symmetrical to each other about a vehicle width center line.

The main camera 11a and the sub-camera 11b may image a frontal traveling environment outside the own vehicle M from different points of view to provide a stereo image. An imaging cycle of the main camera 11a and an imaging cycle of the sub-camera 11b may be synchronized with each other.

The IPU 12 may perform predetermined image processing on the image of the traveling environment captured by the stereo camera 11 to detect edges of various objects such as three-dimensional objects or dividing lines on a road surface that appear in the image. Thereafter, the IPU 12 may retrieve distance data from the amount of a positional shift of each edge between the right image and the left image. The IPU 12 may thereby generate image data including the distance data (hereinafter referred to as distance image data).

Based on the distance image data received from the IPU 12, the image recognition ECU 13 may determine right and left dividing lines of a traveling lane on which the own vehicle M travels (hereinafter referred to as an own vehicle traveling lane), the width between the right and left dividing lines (i.e., the width of the own vehicle traveling lane), and the road curvature [1/m] of the own vehicle traveling lane based on the curvatures of the right and left dividing lines. In addition, the image recognition ECU 13 may determine right and left dividing lines of a traveling lane adjacent to the own vehicle traveling lane (hereinafter referred to as an adjacent traveling lane), the width between the right and left dividing lines (i.e., the width of the adjacent traveling lane), and the road curvature of the adjacent traveling lane, for example.

The image recognition ECU 13 may perform predetermined pattern matching on the distance image data to recognize a guardrail, a curbstone, and a median strip each of which extends along the road, and three-dimensional objects such as surrounding vehicles. In the recognition of a three-dimensional object, the image recognition ECU 13 may detect the type of the three-dimensional object, the distance to the three-dimensional object the speed of the three-dimensional object, and the relative speed between the three-dimensional object and the own vehicle M, for example.

These pieces of data recognized by the image recognition ECU 13 may be outputted as traveling environment information to the traveling ECU 14.

In one embodiment, the image recognition ECU 13, the stereo camera 11, and the IPU 12 may each serve as a "traveling environment recognizer" that recognizes the traveling environment information on the traveling environment outside the own vehicle M, as described above.

The traveling ECU 14 may be a control unit that comprehensively controls the driver assistance apparatus 1.

Various kinds of control units may be coupled to the traveling ECU 14 via an in-vehicle communication line such as a controller area network (CAN). Examples of the control units coupled to the traveling ECU 14 may include a cockpit control unit (hereinafter referred to as a CP ECU) 21, an engine control unit (hereinafter referred to as an E/G ECU) 22, a transmission control unit (hereinafter referred to as a T/M ECU) 23, a brake control unit (hereinafter referred to as a BK ECU) 24, and a power steering control unit (hereinafter referred to as a PS ECU) 25.

In addition, various sensors may be coupled to the traveling ECU 14. Examples of the sensors coupled to the traveling ECU 14 may include a locator unit 36, a left-front side sensor 37*lf*, a right-front side sensor 37*rf*, a left-rear side sensor 37*lr*, and a right-rear side sensor 37*rr*.

A human machine interface (HMI) 31 may be coupled to the CP ECU 21. The HMI 31 may be disposed near a driver seat. The HMI 31 may include, for example, an operation switch, a mode selection switch, a steering touch sensor, a turn signal switch, a driver monitoring system (DMS), a touch panel display, a combination meter, and a speaker. The operation switch may be used to set and execute various kinds of driver assistance control, for example. The mode selection switch may be used to switch a driver assistance mode. The steering touch sensor may be used to detect whether a driver is holding a steering wheel. The DMS may be used to authenticate the face of the driver and detect a line of sight of the driver, for example.

When receiving a control signal from the traveling ECU 14, the CP ECU 21 may notify the driver of various kinds of information as appropriate. Examples of the information may include various warnings about a preceding vehicle or the like, an execution status of the driver assistance control, and the traveling environment of the own vehicle M. These pieces of information may be notified by means of image displaying or sound outputting using the HMI 31, for example.

The CP ECU 21 may output various kinds of data inputted by the driver using the HMI 31 to the traveling ECU 14. Examples of the input data may include an on/off operational state of each kind of the driver assistance control, a set vehicle speed of the own vehicle M, and an operational state of the turn signal switch.

A throttle actuator 32 may be coupled to an output side of the E/G ECU 22, for example. In addition, various sensors including a non-illustrated accelerator sensor may be coupled to an input side of the E/G ECU 22, for example.

Based on a control signal received from the traveling ECU 14 or detection signals received from the various sensors, the E/G ECU 22 may control driving of the throttle actuator 32. The E/G ECU 22 may thereby adjust an intake air volume of the engine to generate a desired engine output. Further, the E/G ECU 22 may output signals indicating an accelerator position and the like detected by the various sensors to the traveling ECU 14.

A hydraulic pressure control circuit 33 may be coupled to an output side of the T/M ECU 23. In addition, various sensors including a non-illustrated shift position sensor may be coupled to an input side of the T/M ECU 23. Based on a signal indicating an engine torque estimated by the E/G ECU 22 or detection signals received from the various sensors, the T/M ECU 23 may control the hydraulic pressure to be applied to the hydraulic pressure control circuit 33. The T/M ECU 23 may thereby operate frictional engagement elements and a pulley that are provided in an automatic transmission to convert the engine output at a desired speed ratio. Further, the T/M ECU 23 may output signals indicating a shift position and the like detected by the various sensors to the traveling ECU 14.

A brake actuator 34 may be coupled to an output side of the BK ECU 24. The brake actuator 34 may adjust a brake fluid pressure to be outputted to a brake wheel cylinder provided in each wheel. In addition, various sensors such as a non-illustrated brake pedal sensor, a yaw rate sensor 40, a longitudinal acceleration sensor 41, and wheel speed sensors 42 (a left-front wheel speed sensor 42fl, a right-front wheel speed sensor 42fr, a left-rear wheel speed sensor 42r1, and a right-rear wheel speed sensor 42rr) may be coupled to an input side of the BK ECU 24.

Based on a control signal received from the traveling ECU 14 or detection signals received from the various sensors, the BK ECU 24 may control driving of the brake actuator 34. The BK ECU 24 may thereby generate a braking force large enough to perform forcible brake control (deceleration control) or yaw rate control of the own vehicle M at each wheel as appropriate. The BK ECU 24 may output signals indicating a brake operational state, a yaw rate, a longitudinal acceleration rate, an own vehicle speed, and the like detected by the various sensors to the traveling ECU 14.

An electric power steering motor 35 may be coupled to an output side of the PS ECU 25. The electric power steering motor 35 may apply steering torque generated by the rotational force of a motor to a steering mechanism. Various sensors including a steering torque sensor and a steering angle sensor may be coupled to an input side of the PS ECU 25.

Based on a control signal received from the traveling ECU 14 or detection signals received from the various sensors, the PS ECU 25 may control driving of the electric power steering motor 35. The PS ECU 25 may thereby cause the electric power steering motor 35 to generate steering torque to be applied to a steering mechanism. Further, the PS ECU 25 may output signals indicating steering torque, a steering angle, and the like detected by the various sensors to the traveling ECU 14.

The locator unit 36 may include a GNSS sensor 36a and a high-resolution road map database (hereinafter referred to as a road map DB) 36b.

The GNSS sensor 36a may receive positional signals transmitted from a plurality of positioning satellites to measure a position (e.g., latitude, longitude, and altitude) of the own vehicle M.

The road map DB 36b may be a mass storage medium such as a hard disk drive (HDD). The road map DB 36b may store high-resolution road map data (a dynamic map). The road map data may include, for example, lane line data necessary for the automated driving, for example. The lane line data may include data on the width of a lane, data on a center position coordinate of a lane, data on a traveling azimuth angle of a lane, and data on a limit speed for a lane, for example. The lane line data stored in the road map DB 36b may be data on respective portions of each lane in the road map that are located at intervals of several meters. The road map DB 36b may output the road map data on a range set with reference to the own vehicle position measured by the GNSS sensor 36a as the traveling environment information to the traveling ECU 14, for example.

In one embodiment, the road map DB 36b and the GNSS sensor 36a may each serve as the "traveling environment recognizer" that recognizes the traveling environment information on the traveling environment outside the own vehicle M, as described above.

The left-front side sensor 371f and the right-front side sensor 37rf may each include a millimeter-wave radar, for example. These left-front side sensor 371f and the right-front side sensor 37rf may be disposed on left and right sides of a front bumper, respectively, for example. The left-front side sensor 371f and the right-front side sensor 37rf may detect, as the traveling environment information, three-dimensional objects present in a diagonally right-front area, a diagonally left-front area, and side areas of the own vehicle M that are difficult to be recognized from the image captured by the stereo camera 11.

The left-rear side sensor 371r and the right-rear side sensor 37rr may each include a millimeter-wave radar, for example. These left-rear side sensor 371r and the right-rear side sensor 37rr may be disposed on left and right sides of a rear bumper, respectively, for example. The left-rear side sensor 371r and the right-rear side sensor 37rr may detect, as the traveling environment information, three-dimensional objects present in a diagonally left-side area, a diagonally right-side area, and a rearward area of the own vehicle M that are difficult to be recognized by the left-front side sensor 371f and the right-front side sensor 37rf.

When each radar includes a millimeter-wave radar, the millimeter-wave radar may output an electric wave to an object and analyze a reflective wave from the object. The millimeter-wave radar may thereby detect an object such as a vehicle traveling in parallel to the own vehicle M or a vehicle traveling behind the own vehicle M, for example. For instance, each radar may detect, as information on the object, the width of a three-dimensional object, a position of a representative point of the three-dimensional object (a relative position with respect to the own vehicle M), and a speed of the three-dimensional object.

In one embodiment, the left-front side sensor 37l*f*, the right-front side sensor 37r*f*, the left-rear side sensor 37l*r*, and the right-rear side sensor 37*rr* may each serve as the "traveling environment recognizer" that recognizes the traveling environment information on the traveling environment outside the own vehicle M, as described above.

The coordinates of the objects present outside the own vehicle M included in the traveling environment information acquired by the image recognition ECU 13, the locator unit 36, the left-front side sensor 37l*f*, the right-front side sensor 37r*f*, the left-rear side sensor 37l*r*, and the right-rear side sensor 37*rr* may be converted into coordinates on a three-dimensional coordinate system having an origin at the center of the own vehicle M, for example. Such a conversion of the coordinates may be performed by the traveling ECU 14, for example.

As drive modes of the traveling ECU 14, a manual drive mode, a first traveling control mode and a second traveling control mode that are modes for traveling control, and an evacuation mode may be set. These drive modes may be selectively switched by the traveling ECU 14. The switching between the drive modes may be performed based on an operational state of the mode selection switch provided on the HMI 31, for example.

The manual drive mode may be a drive mode in which the steering wheel is to be held by the driver. That is, in the manual drive mode, the own vehicle M may travel in accordance with a driving operation such as a steering operation, an accelerating operation, or a braking operation performed by the driver.

Like the manual drive mode, the first traveling control mode may be a drive mode in which the steering wheel is to be held by the driver. That is, the first traveling control mode may be a semi-automated drive mode in which the own vehicle M is automatically driven while a driving operation performed by the driver is being reflected on the travel of the own vehicle M. To achieve the first traveling control mode, various control signals may be outputted from the traveling ECU 14 to the E/G ECU 22, the BK ECU 24, and the PS ECU 25, for example. In the first traveling control mode, adaptive cruise control (ACC), active lane keep centering (ALKC) control, active lane keep bouncing (ALKB) control, and the like may be performed in any combination as appropriate. This enables the own vehicle M to travel along a target traveling course.

The ACC may be performed based on the traveling environment information received from the image recognition ECU 13, for example.

For instance, when no preceding vehicle is recognized in front of the own vehicle M by the image recognition ECU 13, the traveling ECU 14 may perform constant speed traveling control as a part of the ACC. In the constant speed traveling control, the traveling ECU 14 may perform acceleration and deceleration control of the own vehicle M based on a target vehicle speed which is a set vehicle speed inputted by the driver. The traveling ECU 14 may thereby maintain a vehicle speed of the own vehicle M at the set vehicle speed.

In contrast, when a preceding vehicle is recognized in front of the own vehicle M by the image recognition ECU 13, the traveling ECU 14 may perform following traveling control as a part of the ACC. In the following traveling control, the traveling ECU 14 may set a target inter-vehicular distance based on, for example, a vehicle speed of the preceding vehicle, and perform acceleration and deceleration control to maintain the target inter-vehicular distance.

The ALKC control and the ALKB control may be performed based on the traveling environment information received from one or both of the image recognition ECU 13 and the locator unit 36. For example, the traveling ECU 14 may set a target advancing path extending in the middle of the own vehicle traveling lane along right and left dividing lines, based on lane dividing line data included in the traveling environment information, for example. Thereafter, the traveling ECU 14 may perform feedforward control and feedback control of a steering operation based on the target advancing path to keep the own vehicle M traveling in the middle of the lane.

The second traveling control mode may be a drive mode in which the steering wheels is not to be held by the driver and an accelerating operation and a braking operation are not to be performed by the driver to cause the own vehicle M to travel. That is, the second traveling control mode may be an automated drive mode in which the own vehicle M autonomously travels even when a driving operation is not performed by the driver. To achieve the second traveling control mode, various control signals may be outputted from the traveling ECU 14 to the E/G ECU 22, the BK ECU 24, and the PS ECU 25, for example. In the second traveling control mode, preceding vehicle following control, the ALKC control, the ALKB control and the like may be performed in any combination as appropriate. This enables the own vehicle M to travel based on a target route or route map information.

The evacuation mode may be a mode in which the own vehicle M is automatically stopped in a roadside area or the like. The evacuation mode may be executed in a case where the own vehicle M becomes unable to continue to travel when traveling in the second traveling control mode and where the driving operation is not able to be taken over by the driver, for example. That is, the evacuation mode may be performed when the own vehicle M is not able to be switched to the manual drive mode or the first traveling control mode.

In each of the drive modes described above, the traveling ECU 14 may be configured to perform autonomous emergency braking (AEB) control to avoid an obstacle having a possibility of contact with the own vehicle M.

In the AEB control, deceleration control (automatic deceleration control) may be performed to avoid contact of the own vehicle M with an obstacle present in front of the own vehicle M on the target advancing path.

In the AEB control, the traveling ECU 14 may calculate an estimated time to contact with the obstacle. Thereafter, the traveling ECU 14 may execute the deceleration control in a stepwise manner based on the result of comparison between the estimated time to contact and a predetermined threshold.

Further, the traveling ECU 14 may perform acceleration control (automatic acceleration control) or deceleration control (automatic deceleration control) as appropriate while the second traveling control mode is being selected, for example.

For example, when a color of traffic light installed in front of the own vehicle M traveling on the own vehicle traveling lane is red, the traveling ECU 14 may determine a target deceleration rate to decelerate and stop the own vehicle M (to decelerate the own vehicle speed to 0 (zero)) before a stop line. Thereafter, the traveling ECU 14 may perform the automatic deceleration control based on the target deceleration rate.

Further, when a color of a traffic light installed in front of the own vehicle M traveling on the own vehicle traveling lane changes from red to green, for example, the traveling ECU 14 may determine a target acceleration rate to accelerate the own vehicle M to a predetermined target vehicle speed in a preset time period. Thereafter, the traveling ECU 14 may perform the automatic acceleration control based on the target acceleration rate.

Further, when a curve is recognized in front of the own vehicle M traveling on the own vehicle traveling lane, for example, the traveling ECU 14 may determine a target deceleration rate to decelerate the own vehicle speed to an appropriate vehicle speed. Thereafter, the traveling ECU 14 may perform the automatic deceleration control based on the target deceleration rate.

In the automatic deceleration control of the own vehicle M, the traveling ECU 14 may monitor slip states of the wheels of the own vehicle M. For example, the traveling ECU 14 may determine that the own vehicle M is slipping when a current deceleration rate is lower than an estimated deceleration rate in the automatic deceleration control. In detail, the traveling ECU 14 may determine that the own vehicle M is slipping when the difference between a deceleration rate detected by the longitudinal acceleration sensor 41 and the target deceleration rate for the automatic deceleration control is greater than or equal to a predetermined value, for example.

When determining that the own vehicle M is slipping, the traveling ECU 14 may estimate a frictional coefficient $\mu$ of a road surface (hereinafter referred to as a road surface $\mu$) where the own vehicle M starts slipping as a first road surface $\mu$. The first road surface $\mu$ may be estimated by a known calculation method based on a longitudinal acceleration rate of the own vehicle M and a wheel speed of each wheel of the own vehicle M, for example.

Further, the traveling ECU 14 may detect a high frictional coefficient area (hereinafter referred to as a high $\mu$ area) that has a second road surface $\mu$ higher than the first road surface $\mu$ and is located in front of the own vehicle M. The high $\mu$ area may be detected based on image data acquired by a camera (e.g., the stereo camera 11), for example. For this purpose, a map indicating a relation between a road surface color and a road surface $\mu$ may be stored in the traveling ECU 14 in advance, for example (refer to FIG. 4). As indicated in the map, a black region of a road area in the road map may be estimated to be a road surface on which asphalt is exposed, for example. A brown region of the road area in the road map may be estimated to be a road surface covered with soil or unpaved road surface. A white region of the road area in the road map may be estimated to be a road surface covered with snow. In addition, the amount of snow accumulated on the road surface in the white region may be estimated based on data on a height direction of the white region. A transparent region of the road area in the road map may be estimated to be a road surface covered with ice. A transparent region with water of the road area in the road map may be estimated to be a road surface covered with melted ice.

Based on the results of estimation of the road surface conditions, the traveling ECU 14 may estimate the road surface $\mu$ of each area located in front of the own vehicle M. For example, as illustrated in FIG. 4, a black road surface may be estimated to have a higher road surface $\mu$ than a brown road surface. The brown road surface may be estimated to have a higher road surface $\mu$ than a white road surface. The white road surface may be estimated to have a higher road surface $\mu$ than a transparent road surface. In this case, a road surface on which a large amount of snow is accumulated may be estimated to have a higher road surface $\mu$ than a road surface on which a small amount of snow is accumulated. A transparent road surface may be estimated to have a higher road surface $\mu$ than a transparent road surface with water. Optionally, a fixed value of the road surface $\mu$ determined by an experiment or the like may be assigned to each of the road surfaces having respective colors.

The traveling ECU 14 may extract the high $\mu$ area by comparing the color of the road surface where the own vehicle M is determined to be slipping with the color of the road surface in front of the own vehicle M, for example. For example, when the color of the road surface where the own vehicle M is determined to be slipping is transparent, the white, brown, or black region of the road surface in front of the own vehicle M may be extracted as the high $\mu$ area.

Figure 6:
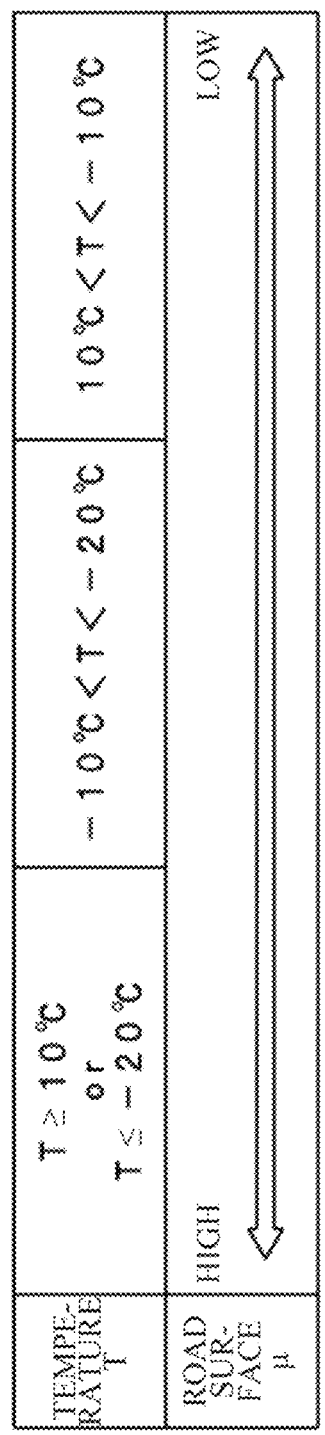
FIG. 6 is a map illustrating a relation between an ambient temperature and the road surface μ according to one example embodiment of the disclosure.

The road surface $\mu$ estimated based on the road surface color may be corrected based on a road surface temperature Tr and a temperature T, for example. For this purpose, a map indicating a relation between the road surface temperature Tr and the road surface $\mu$ (refer to FIG. 5) and a map indicating a relation between the temperature T and the road surface $\mu$ (refer to FIG. 6) may be stored in the traveling ECU 14 in advance.

When multiple high $\mu$ areas are extracted, the traveling ECU 14 may prioritize the high $\mu$ areas. In the prioritization, a higher order of priority is given to a high $\mu$ area having a higher frictional coefficient $\mu$. The traveling ECU 14 may prioritize the high $\mu$ areas based on the locations of the high $\mu$ areas on an own vehicle traveling route (hereinafter referred to as road locations) and the traveling environment information. For example, as illustrated in FIG. 7, the traveling stability of the own vehicle M traveling in a region adjacent to a road center line may differ depending on the presence or absence of an oncoming vehicle and the presence or absence of a median strip. In addition, the traveling stability of the own vehicle M traveling in a region adjacent to a road shoulder may differ depending on the presence or absence of a gutter, a snow wall, a pedestrian, and a step between the traveling lane and the road shoulder. Accordingly, in the example embodiment the traveling ECU 14 may prioritize the high $\mu$ areas based on the road surface $\mu$ of the high $\mu$ areas, and the traveling stability determined based on the road locations of the high $\mu$ areas and the traveling environment information.

The traveling ECU 14 may set a route including the high $\mu$ area given with the highest order of priority as a deceleration route for the automatic deceleration control on which the own vehicle M is to travel.

Further, the traveling ECU 14 may set a target deceleration rate for each road surface $\mu$ on the deceleration route. In this case, the traveling ECU 14 may set the target deceleration rate for the high $\mu$ area to a higher value than the target deceleration rate determined at the occurrence of the slip. The traveling ECU 14 may reduce a deceleration distance extended by the slip to an initial deceleration distance by setting such a high target deceleration rate for the high μ area.

Thereafter, the traveling ECU 14 may perform the deceleration control of the own vehicle M along the deceleration route based on the target deceleration rate set for each region.

Figure 8:
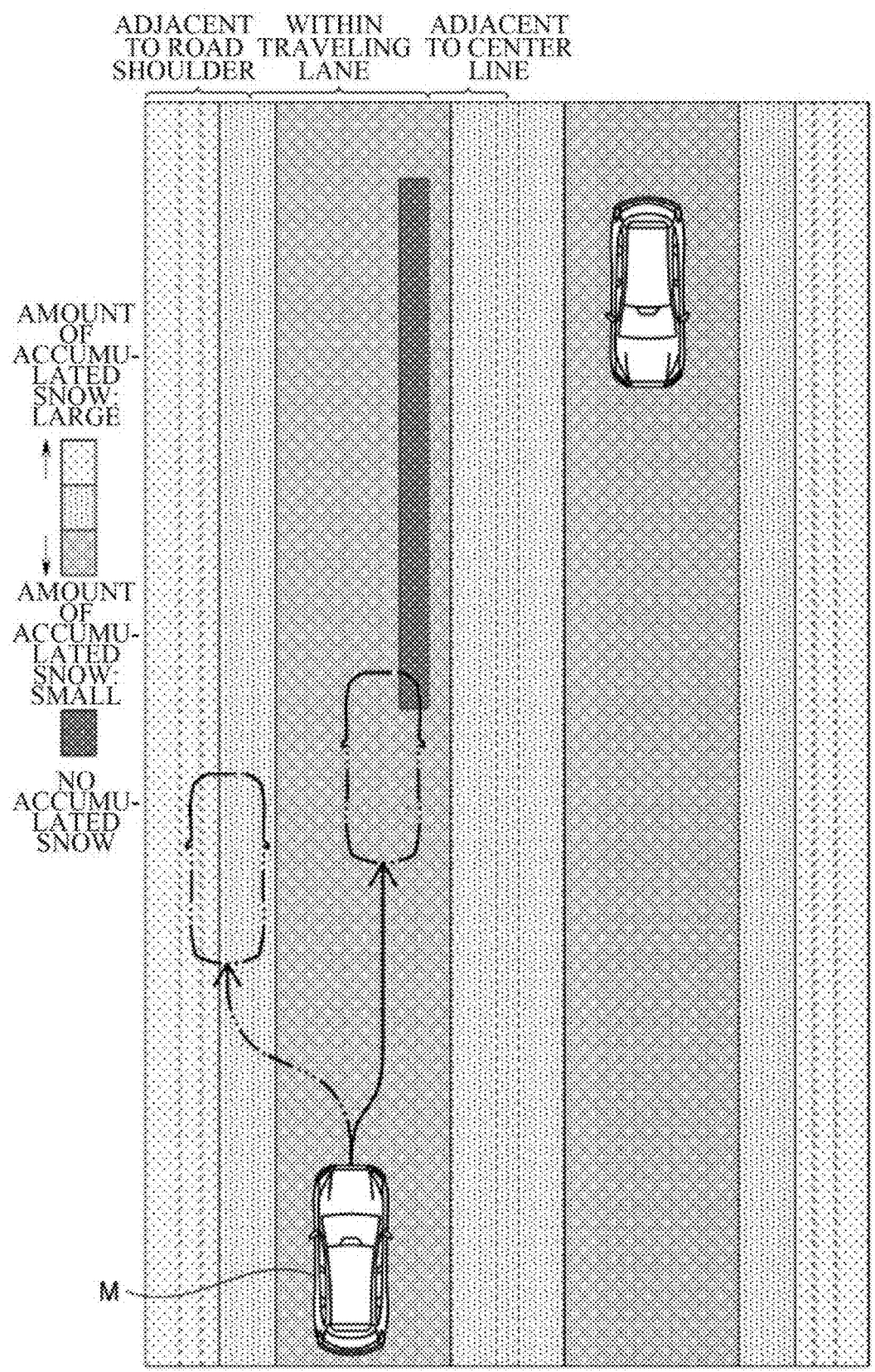
FIG. 8 is a schematic diagram illustrating an example of a road surface condition in which there is a high μ area corresponding to one of a right wheel-side and a left-wheel side of a vehicle.
Figure 9:
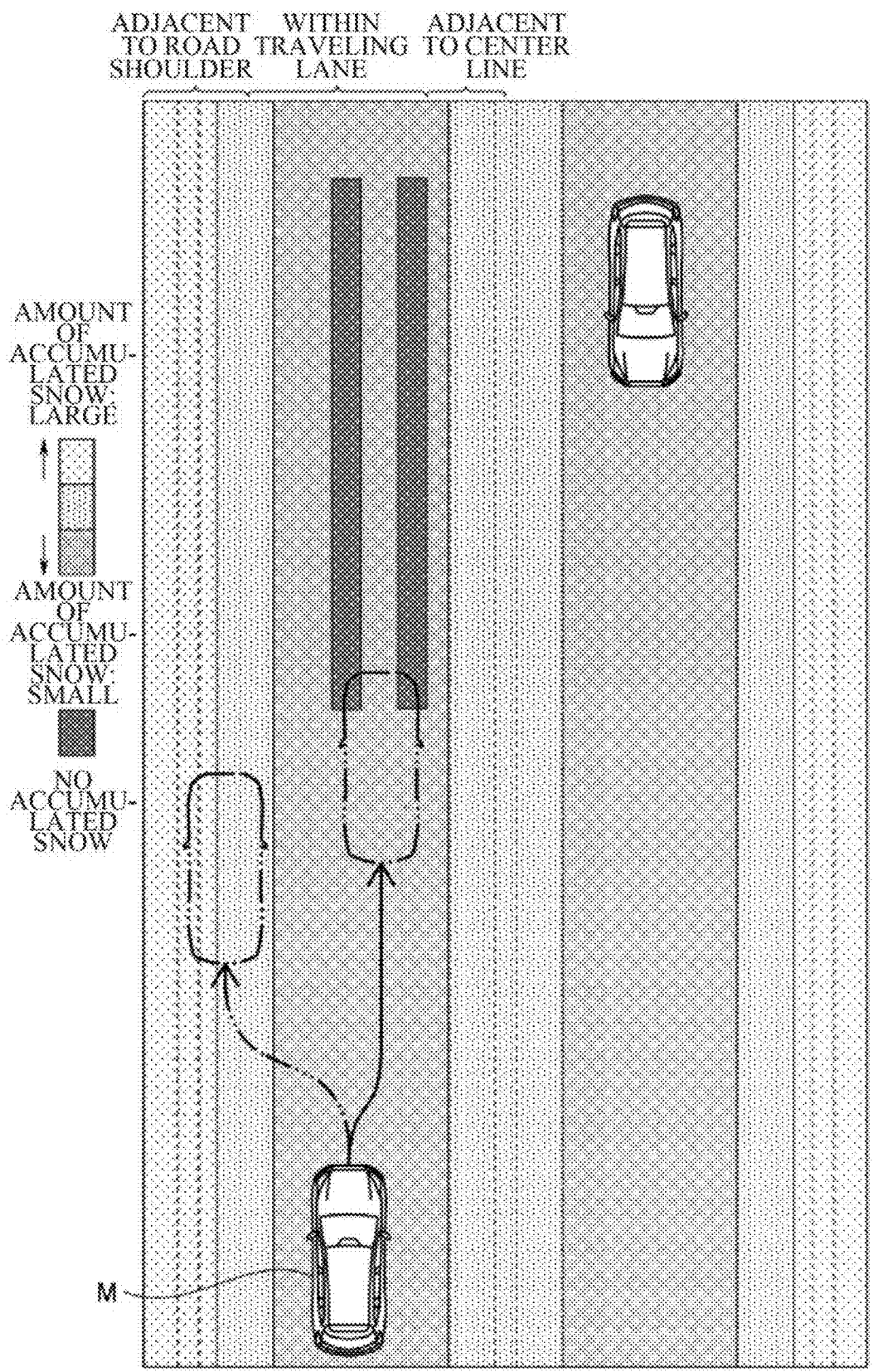
FIG. 9 is a schematic diagram illustrating an example of a road surface condition in which there are high frictional coefficient areas corresponding to both of the right-wheel side and the left-wheel side of the vehicle.
Figure 10:
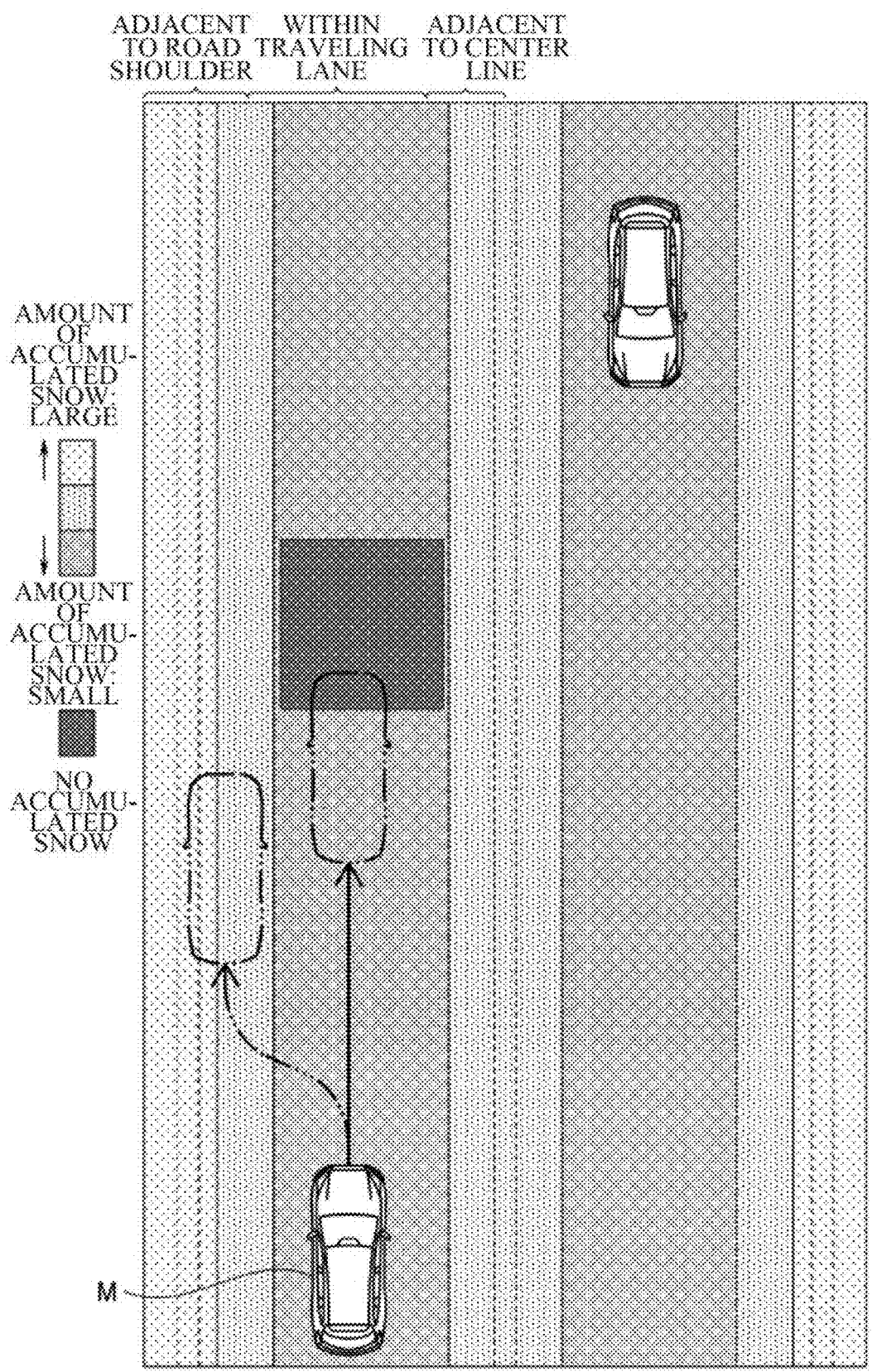
FIG. 10 is a schematic diagram illustrating an example of a road surface condition in which there is a high μ area crossing an own vehicle traveling lane.

During the deceleration control, the traveling ECU 14 may determine whether the high μ area on the deceleration route corresponds to one of a right-wheel side and a left-wheel side of the own vehicle M (see a deceleration route indicated by a solid line in FIG. 8, for example) or the high μ area on the deceleration route corresponds to both of the right-wheel side and the left-wheel side of the own vehicle M (see deceleration routes indicated by solid lines in FIGS. 9 and 10, for example). When it is determined that the high μ area corresponds to one of the right-wheel side and the left-wheel side, the traveling ECU 14 may additionally perform steering control to cancel out a yaw rate generated due to the difference in the road surface μ between the right-wheel side and the left-wheel side.

Likewise, in the automatic acceleration control of the own vehicle M, the traveling ECU 14 may monitor the slip states of the wheels. For example, the traveling ECU 14 may determine that the own vehicle M is slipping when a current acceleration rate is lower than an estimated acceleration rate in the automatic acceleration control. In detail, the traveling ECU 14 may determine that the own vehicle M is slipping when the difference between an acceleration rate detected by the longitudinal acceleration sensor 41 and the target acceleration rate for the automatic acceleration control is greater than or equal to a predetermined value, for example.

When determining that the own vehicle M is slipping, the traveling ECU 14 may estimate the road surface μ of the location where the own vehicle M starts slipping as the first road surface μ.

Further, the traveling ECU 14 may detect the high μ area that has the second road surface μ higher than the first road surface μ and is located in front of the own vehicle M.

Thereafter, in a case where the high μ area having a road surface μ greater than the first road surface μ by a threshold value or greater is located on the own vehicle traveling route and where the own vehicle M is not able to avoid the high μ area by steering, the traveling ECU 14 may set a target acceleration rate for each road surface μ. In this case, the traveling ECU 14 may set a target acceleration rate corresponding to the first road surface μ as a target acceleration rate for an area other than the high μ area, for example. That is, the target acceleration rate for the other area than the high μ area may beset to a lower value than the target acceleration rate determined at the occurrence of the slip. This helps to prevent the wheels from slipping in the automatic acceleration control. Further, the traveling ECU 14 may set the target acceleration rate for the high μ area to a further lower value than the target acceleration rate for the other area. This helps to prevent the own vehicle M from being suddenly accelerated (i.e., from exhibiting μ-jump) due to a sudden increase in grip forces of the wheels in the high μ area.

In contrast, in a case where the high μ area having a road surface μ greater than the first road surface μ by the threshold value or greater is located on the own vehicle traveling route and where the own vehicle M is able to avid the high μ area on the own vehicle traveling route by steering, the traveling ECU 14 may perform the steering to avoid the high μ area. Further, the traveling ECU 14 may set the target acceleration rate corresponding to the first road surface μ.

When the high μ area having a road surface μ greater than the first road surface μ by the threshold value or greater is not located on the own vehicle traveling route, the traveling ECU 14 may set the target acceleration rate corresponding to the first road surface μ.

Thereafter, the traveling ECU 14 may perform the acceleration control of the own vehicle M based on the set target acceleration rate.

In one embodiment, the traveling ECU 14 may serve as a "determinator" that determines the slip state of the vehicle, an "estimator" that estimates the first road surface μ, a "detector" that detects the high μ area, a "deceleration rate setter" that sets the target deceleration rate, a "steering control processor", and an "acceleration rate setter" that sets the target acceleration rate, as described above.

Figure 2:
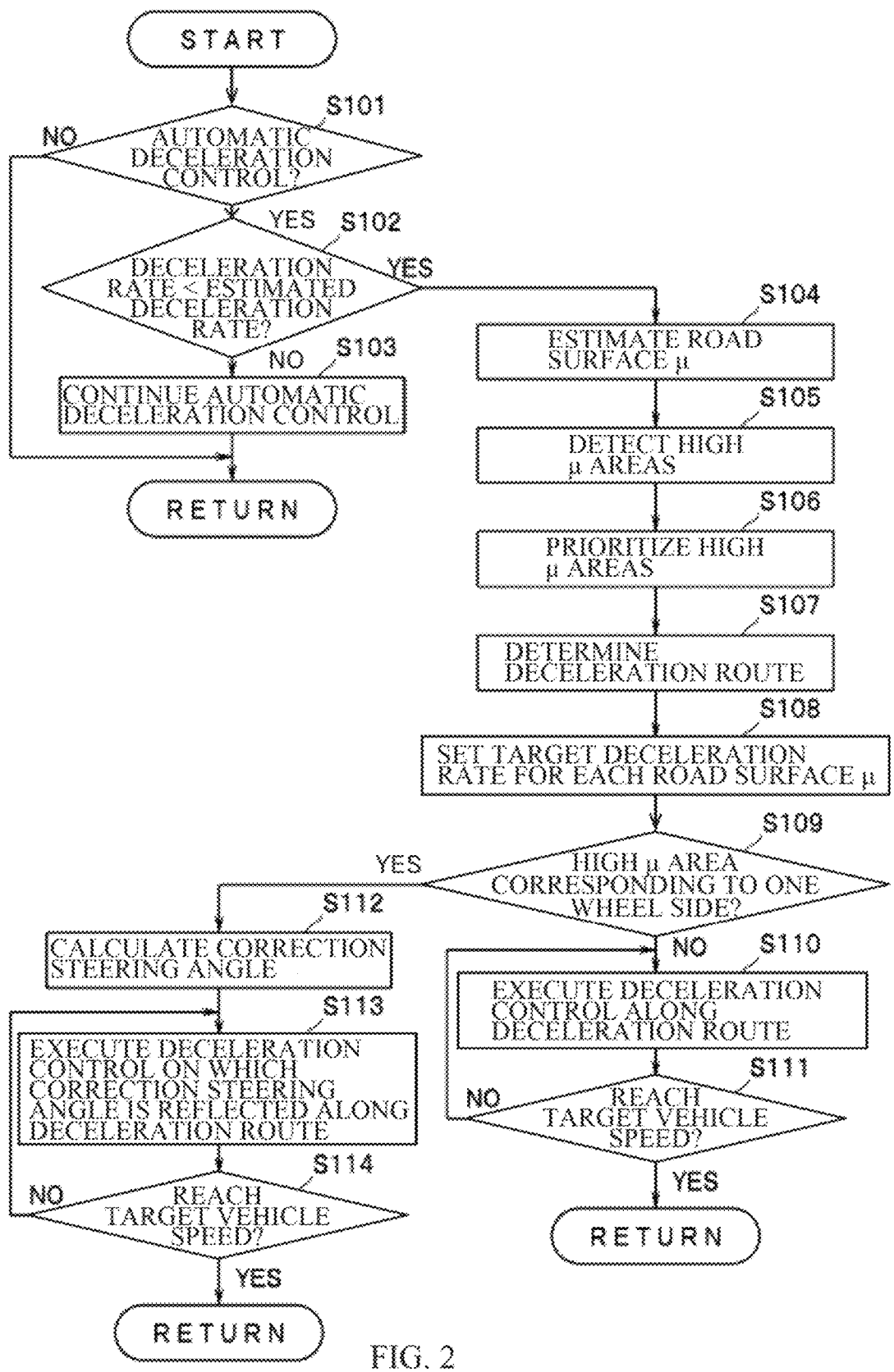
FIG. 2 is a flowchart of an exemplary routine in automatic deceleration control according to one example embodiment of the disclosure.

Next, an exemplary routine of the deceleration control in the automatic deceleration control is described with reference to a flowchart illustrated in FIG. 2. The traveling ECU 14 may repeatedly execute the routine for each set time.

After the routine starts, the traveling ECU 14 may determine whether the automatic deceleration control of the own vehicle M is being executed in Step S101.

When it is determined that the automatic deceleration control is not being executed (Step S101: NO), the traveling ECU 14 may cause the process to exit the routine.

In contrast, when it is determined that the automatic deceleration control is being executed (Step S101: YES), the traveling ECU 14 may cause the process to proceed to Step S102.

In Step S102, the traveling ECU 14 may determine whether a current deceleration rate of the own vehicle M in the deceleration control is lower than the estimated deceleration rate. For example, the traveling ECU 14 may determine whether the difference between the target deceleration rate set for the automatic deceleration control currently executed and the acceleration rate (deceleration rate) detected by the longitudinal acceleration sensor 41 is greater than or equal to the predetermined value.

When it is determined that the deceleration rate of the own vehicle M is within the estimated range and that the own vehicle M is not slipping (Step S102: NO), the traveling ECU 14 may cause the process to proceed to Step S103.

In Step S103, the traveling ECU 14 may continue to perform the automatic deceleration control based on the target deceleration rate set at the start of the automatic deceleration control, and may cause the process to exit the routine.

In contrast, when it is determined that the deceleration rate of the own vehicle M is lower than the estimated deceleration rate and that the own vehicle M is slipping (Step S102: YES), the traveling ECU 14 may cause the process to proceed to Step S104.

In Step S104, the traveling ECU 14 may estimate a current road surface μ as the first road surface μ. For example, the traveling ECU 14 may estimate the road surface μ at the location where the own vehicle M starts slipping as the first road surface μ.

Thereafter, in Step S105, the traveling ECU 14 may detect the high μ areas that have the second road surface μ higher than the first road surface μ and are located in front of the own vehicle M.

Thereafter, in Step S106, the traveling ECU 14 may prioritize the high μ areas. For example, when the multiple high μ areas are detected, the traveling ECU 14 may prioritize the high μ areas based on the second road surface μ of each high μ areas, the road locations of the high μ areas, and the traveling environment information.

Thereafter, in Step S107, the traveling ECU 14 may set the deceleration route including the high μ area having the highest order of priority as the route for the automatic deceleration control.

Thereafter, in Step S108, the traveling ECU 14 may set the target deceleration rate for each road surface μ on the set deceleration route.

Thereafter, in Step Sl09, the traveling ECU 14 may determine whether the high μ area on the deceleration route corresponds to one of the right-wheel side and the left-wheel side of the own vehicle M.

When it is determined that the high μ area on the deceleration route corresponds to one of the right-wheel side and the left wheel side of the own vehicle M (Step S109: YES), the traveling ECU 14 may cause the process to proceed to Step S112.

In contrast, when it is determined that the high μ area on the deceleration route corresponds to both of the right-wheel side and the left-wheel side of the own vehicle M (Step S109: NO), the traveling ECU 14 may cause the process to proceed to Step S110.

When the process proceeds from Step S109 to Step S110, the traveling ECU 14 may execute the deceleration control along the deceleration route based on the target deceleration rate set in Step S108.

Thereafter, in Step S111, the traveling ECU 14 may determine whether the own vehicle speed has reached the target vehicle speed set at the start of the automatic deceleration control.

When it is determined that the own vehicle speed has not reached the target vehicle speed (Step S111: NO), the traveling ECU 14 may return the process to Step S110.

In contrast, when it is determined that the own vehicle speed has reached the target vehicle speed (Step S111: YES), the traveling ECU 14 may cause the process to exit the routine.

When the process proceeds from Step S109 to Step S112, the traveling ECU 14 may calculate a correction steering angle to cancel out the yaw rate generated due to the difference in the road surface μ between the right-wheel side and the left-wheel side.

Thereafter, in Step S113, the traveling ECU 14 may execute the deceleration control along the deceleration route based on the target deceleration rate set in Step S108. In the deceleration control, the traveling ECU 14 may perform the steering control on which the correction steering angle set in Step S112 is reflected.

Thereafter, in Step S114, the traveling ECU 14 may determine whether the own vehicle speed has reached the target vehicle speed set at the start of the automatic deceleration control.

When it is determined that the own vehicle speed has not reached the target vehicle speed (Step S114: NO), the traveling ECU 14 may return the process to Step S113.

In contrast, when it is determined that the own vehicle speed has reached the target vehicle speed (Step S114. YES), the traveling ECU 14 may cause the process to exit the routine.

Figure 3:
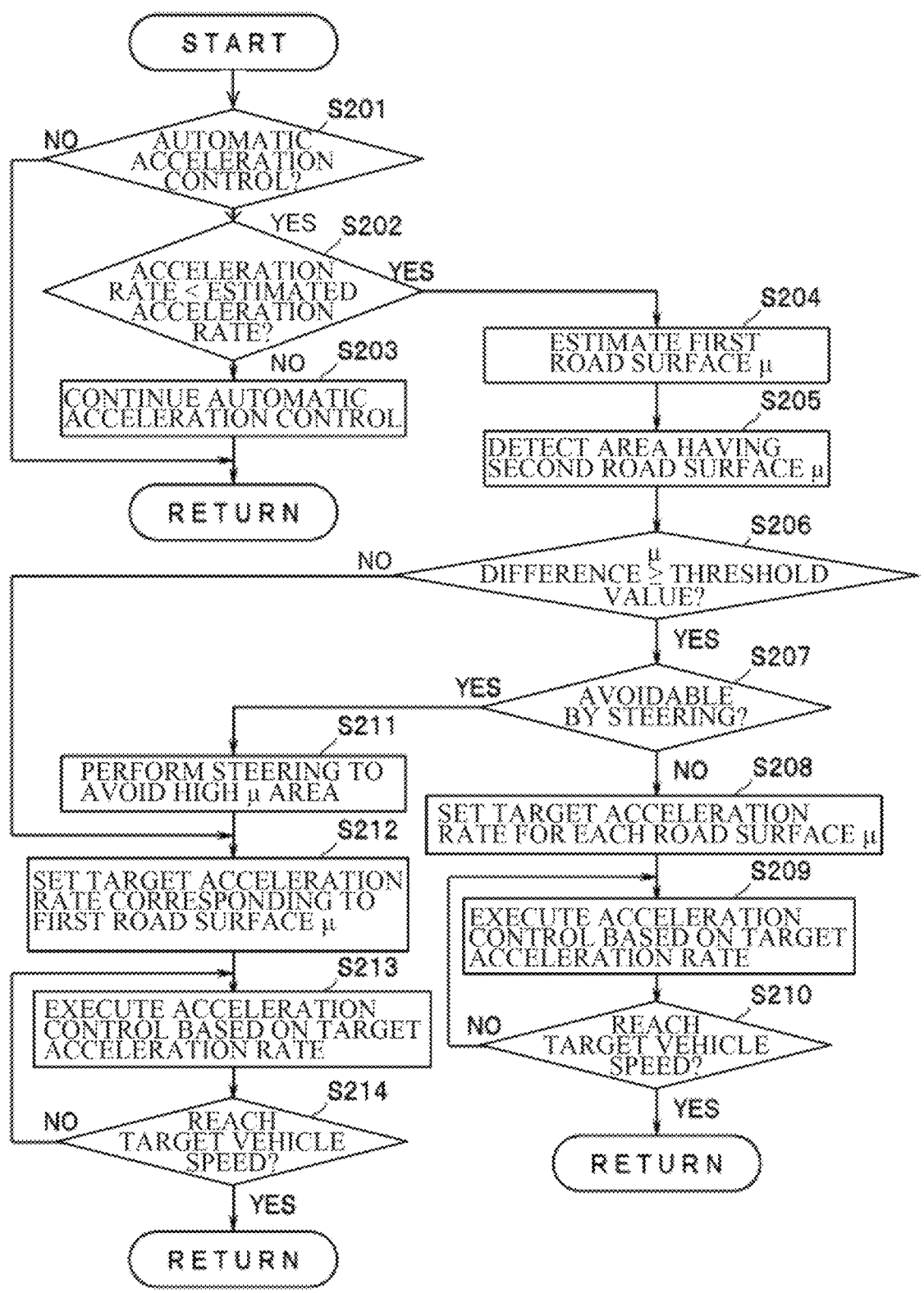
FIG. 3 is a flowchart of an exemplary routine in automatic acceleration control according to one example embodiment of the disclosure.

Next, an exemplary routine of the acceleration control in the automatic acceleration control is described with reference to a flowchart illustrated in FIG. 3. The traveling ECU 14 may repeatedly execute the routine for each set time.

After the routine starts, the traveling ECU 14 may determine whether the automatic acceleration control of the own vehicle M is being executed in Step S201.

When it is determined that the automatic acceleration control is not being executed (Step S201: NO), the traveling ECU 14 may cause the process to exit the routine.

In contrast, when it is determined that the automatic acceleration control is being executed (Step S201: YES), the traveling ECU 14 may cause the process to proceed to Step S202.

In Step S202, the traveling ECU 14 may determine whether a current acceleration rate of the own vehicle M in the acceleration control is lower than the estimated acceleration rate. For example, the traveling ECU 14 may determine whether the difference between the target acceleration rate set for the automatic acceleration control currently executed and the acceleration rate detected by the longitudinal acceleration sensor 41 is greater than or equal to the predetermined value.

When it is determined that the acceleration rate of the own vehicle M is within the estimated range and that the own vehicle M is not slipping (Step S202: NO), the traveling ECU 14 may cause the process to proceed to Step S203.

In Step S203, the traveling ECU 14 may continue to perform the automatic acceleration control based on the target acceleration rate set at the start of the automatic acceleration control, and may cause the process to exit the routine.

In contrast, when it is determined that the acceleration rate of the own vehicle M is lower than the estimated acceleration rate and that the own vehicle M is slipping (Step S202: YES), the traveling ECU 14 may cause the process to proceed to Step S204.

In Step S204, the traveling ECU 14 may estimate a current road surface μ as the first road surface μ. For example, the traveling ECU 14 may estimate the road surface μ at the location where the own vehicle M starts slipping as the first road surface μ.

Thereafter, in Step S205, the traveling ECU 14 may detect the high μ areas that have the second road surface μ higher than the first road surface μ and are located in front of the own vehicle M.

Thereafter, in Step S206, the traveling ECU 14 may determine whether the high μ area having a road surface μ greater than the first road surface μ by the threshold value or greater is located on the own vehicle traveling route.

When it is determined that the high μ area having road surface μ greater than the first road surface μ by the threshold value or greater is not located on the own vehicle traveling route (Step S206: NO), the traveling ECU 14 may cause the process to proceed to Step S212.

In contrast, when it is determined that the high μ area having a road surface μ greater than the first road surface μ by the threshold value or greater is located on the own vehicle traveling route (Step S206: YES), the traveling ECU 14 may cause the process to proceed to Step S207.

In Step S207, the traveling ECU 14 may determine whether the own vehicle M is able to avoid the high μ area located on the current own vehicle traveling route by steering.

When it is determined that the own vehicle M is not able to avoid the high μ area by steering (Step S207: NO), the traveling ECU 14 may cause the process to proceed to Step S208.

In contrast, when it is determined that the own vehicle M is able to avoid the high μ area by steering (Step S207: YES), the traveling ECU 14 may cause the process to proceed to Step S211.

In Step S211, the traveling ECU 14 may perform the steering to avoid the high μ area, following which the process may proceed to Step S212.

When the process proceeds from Step S206 or Step S211 to Step S212, the traveling ECU 14 may set the target acceleration rate corresponding to the first road surface μ.

Thereafter, in Step S213, the traveling ECU 14 may execute the acceleration control of the own vehicle M based on the target acceleration rate set in Step S212.

Thereafter, in Step S214, the traveling ECU 14 may determine whether the own vehicle speed has reached the target vehicle speed set at the start of the automatic acceleration control.

When it is determined that the own vehicle speed has not reached the target vehicle speed (Step S214: NO), the traveling ECU 14 may return the process to Step S213.

In contrast, when it is determined that the own vehicle speed has reached the target vehicle speed (Step S214: YES), the traveling ECU 14 may cause the process to exit the routine.

When the process proceeds from Step S207 to Step S208, the traveling ECU 14 may set the target acceleration rate for each road surface μ on the own vehicle traveling route. In this case, the traveling ECU 14 may set the target acceleration rate corresponding to the first road surface μ as the target acceleration rate for the other area than the high μ area, for example. Further, the traveling ECU 14 may set the target acceleration rate for the high μ area to a further lower value than the target acceleration rate for the other area than the high μ area.

Thereafter, in Step S209, the traveling ECU 14 may execute the acceleration control of the own vehicle M based on the target acceleration rate set in Step S208.

Thereafter, in Step S210, the traveling ECU 14 may determine whether the own vehicle speed has reached the target vehicle speed set at the start of the automatic acceleration control.

When it is determined that the own vehicle speed has not reached the target vehicle speed (Step S210: NO), the traveling ECU 14 may return the process to Step S209.

In contrast, when it is determined that the own vehicle speed has reached the target vehicle speed (Step S210: YES), the traveling ECU 14 may cause the process to exit the routine.

According to the example embodiment described above, the traveling ECU 14 determines whether the own vehicle M is slipping in the vehicle speed control involving the automatic deceleration control, and estimates the road surface μ at the location where the own vehicle M starts slipping as the first road surface μ. Further, the traveling ECU 14 detects the high μ area that has the second road surface μ higher than the first road surface μ and is located in front of the own vehicle M. In the vehicle speed control involving the automatic deceleration control, the traveling ECU 14 sets the target deceleration rate to be used when the own vehicle M travels in the high μ area to a higher value than the target deceleration rate set for the first road surface μ. This makes it possible to achieve appropriate vehicle speed control depending on the road surface condition even when the road surface is covered with snow, for example.

When the slip occurs during the deceleration control, the distance (deceleration distance) necessary to decelerate the own vehicle speed to the target vehicle speed is extended. To address this, the traveling ECU 14 sets the target deceleration rate for the high μ area to a higher value than the target deceleration rate for the first road surface μ. This makes it possible to reduce the deceleration distance extended by the slip to an initial deceleration distance set at the start of the automatic deceleration control. It is therefore possible to decelerate the vehicle speed of the own vehicle M to an appropriate vehicle speed before the own vehicle M reaches a position before a traffic light or a position before a curve, for example.

When the high μ area corresponds to one of the right-wheel side and the left-wheel side, the traveling ECU 14 may calculate the correction steering angle defined in the direction in which the yaw rate generated due to the difference in the road surface μ between the right-wheel side and the left-wheel side is cancelled out, in the deceleration control. This makes it possible to achieve appropriate deceleration control by effectively utilizing the high μ area even when the high μ area corresponds to one of the right-wheel side and the left-wheel side.

In addition, the traveling ECU 14 determines whether the own vehicle M is slipping in the vehicle speed control involving the automatic acceleration control, and estimates the road surface μ at the location where the own vehicle M starts slipping as the first road surface μ. Further, the traveling ECU 14 detects the high μ area that has the second road surface μ higher than the first road surface μ and is located in front of the own vehicle M. In the vehicle speed control involving the automatic acceleration control, the traveling ECU 14 sets the target acceleration rate to be used when the own vehicle M travels in the high μ area to a lower value than the target acceleration rate set for the first road surface μ. This makes it possible to achieve appropriate vehicle speed control depending on the road surface condition even when the road surface is covered with snow, for example.

When the slip occurs during the acceleration control, the distance (acceleration distance) necessary to accelerate the own vehicle speed to the target vehicle speed is extended. However, it is unlikely in the acceleration control that a target point at which the own vehicle speed will be accelerated to the target vehicle speed is set. In addition, it is important in the acceleration control to suppress a sudden change in acceleration rate on a traveling route where a slip is likely to occur, in order to improve running stability and ride comfort, for example. To address these concerns, the traveling ECU 14 sets the target acceleration rate for the high μ area to a lower value than the target acceleration rate for the first road surface μ. This suppresses a sudden change in acceleration rate in the high μ area. It is therefore possible to achieve stable acceleration traveling.

Note that, when the difference between the road surface μ of the high μ area (the second road surface μ) and the first road surface μ is less than the threshold value, the traveling ECU 14 may maintain the target acceleration rate for the first road surface μ as the target acceleration rate for the high μ area. This makes it possible to simplify the acceleration control on the traveling route on which a sudden change in acceleration rate in the high μ area is unlikely to be predicted.

In a case where the difference between the first road surface μ and the second road surface μ of the high μ area is greater than or equal to the threshold value and where the own vehicle M is able to avoid the high μ area, the traveling ECU 14 may perform the steering control to avoid the high μ area. This makes it possible to simplify the acceleration control and suppress a sudden change in acceleration rate as appropriate.

As described above, the traveling ECU 14 performs the automatic deceleration control and the automatic acceleration control to cope with the high μ area in an opposite manner. That is, in the automatic deceleration control, the traveling ECU 14 sets the target deceleration rate for the high μ area to a higher value than the target deceleration rate for the other area. In contrast, in the automatic acceleration control, the traveling ECU 14 sets the target acceleration rate for the high μ area to a lower value than the target acceleration rate for the other area. The acceleration and deceleration control makes it possible to achieve vehicle speed control depending on the road surface conditions as appropriate while securing running stability.

In the example embodiment described above, the image recognition ECU 13, the traveling ECU 14, the CP ECU 21, the E/G ECU 22, the T/M ECU 23, the BK ECU 24, and the PS ECU 25 may each include a known microcomputer that includes a CPU, a RAM, a ROM, a non-volatile memory, or the like, and a peripheral device. The ROM may preliminarily store a program to be executed by the CPU and fixed data such as data table. Some or all of the operations of the processor may be performed by logic circuitry or analog circuitry. In addition, various kinds of programs may be processed by electronic circuitry such as a FPGA.

The disclosure is not limited to the example embodiments described above, and various modifications of the example embodiments may be made without departing from the gist of the disclosure. Further, the example embodiments described above include various aspects of the disclosure, and various example embodiments of the disclosure may be extracted by combining the constituent elements described herein as appropriate.

For example, when it is possible to address the concerns described above even if some constituent elements are deleted from all the constituent elements described in the respective example embodiments. When the effects described above are obtainable, a configuration from which the constituent elements are deleted may be extracted as an example embodiment of the disclosure.

The invention claimed is:

1. A driver assistance apparatus for a vehicle, the driver assistance apparatus comprising:
    a determiner configured to determine whether the vehicle is slipping in vehicle speed control, the vehicle speed control involving acceleration or deceleration of the vehicle;
    an estimator configured to estimate a road surface frictional coefficient at a location where the vehicle starts slipping as a first road surface frictional coefficient;
    a detector configured to detect a high frictional coefficient area that has a second road surface frictional coefficient higher than the first road surface frictional coefficient and is located in front of the vehicle, and
    a deceleration rate setter configured to set, in the vehicle speed control involving the deceleration, a target deceleration rate to be used when the vehicle travels in the high frictional coefficient area to a higher value than the target deceleration rate set for the first road surface frictional coefficient.

2. The driver assistance apparatus according to claim 1, further comprising
    a steering control processor configured to perform, in the vehicle speed control involving the deceleration, steering control of the vehicle in a direction in which a yaw rate generated at the vehicle is cancelled out when one of a right-wheel side and a left-wheel side of the vehicle passes through the high frictional coefficient area.

3. The driver assistance apparatus according to claim 1, further comprising
    an acceleration rate setter configured to set, in the vehicle speed control involving the acceleration, a target acceleration rate to be used when the vehicle travels in the high frictional coefficient area to a lower value than the target acceleration rate set for the first road surface frictional coefficient.

4. A driver assistance apparatus for a vehicle, the driver assistance apparatus comprising:
    a determiner configured to determine whether the vehicle is slipping in vehicle speed control involving acceleration or deceleration of the vehicle;
    an estimator configured to estimate a road surface frictional coefficient at a location where the vehicle starts slipping as a first road surface frictional coefficient;
    a detector configured to detect a high frictional coefficient area that has a second road surface frictional coefficient higher than the first road surface frictional coefficient and is located in front of the vehicle; and
    an acceleration rate setter configured to set, in the vehicle speed control involving the acceleration, a target acceleration rate to be used when the vehicle travels in the high frictional coefficient area to a lower value than the target acceleration rate set for the first road surface frictional coefficient.

5. A driver assistance apparatus for a vehicle, the driver assistance apparatus comprising
    a processor configured to
    determine whether the vehicle is slipping in vehicle speed control involving acceleration or deceleration of the vehicle,
    estimate a road surface frictional coefficient at a location where the vehicle starts slipping as a first road surface frictional coefficient,
    detect a high frictional coefficient area that has a second road surface frictional coefficient higher than the first road surface frictional coefficient and is located in front of the vehicle, and
    set, in the vehicle speed control involving the deceleration, a target deceleration rate to be used when the vehicle travels in the high frictional coefficient area to a higher value than the target deceleration rate set for the first road surface frictional coefficient.

6. A driver assistance apparatus for a vehicle, the driver assistance apparatus comprising
    a processor configured to
    determine whether the vehicle is slipping in vehicle speed control involving acceleration or deceleration of the vehicle,
    estimate a road surface frictional coefficient at a location where the vehicle starts slipping as a first road surface frictional coefficient,
    detect a high frictional coefficient area that has a second road surface frictional coefficient higher than the first road surface frictional coefficient and is located in front of the vehicle, and
    set, in the vehicle speed control involving the acceleration, a target acceleration rate to be used when the vehicle travels in the high frictional coefficient area to a lower value than the target acceleration rate set for the first road surface frictional coefficient.

* * * * *